United States Patent
Krauβ et al.

(10) Patent No.: US 9,534,758 B2
(45) Date of Patent: Jan. 3, 2017

(54) METHOD AND DEVICE FOR SETTING A PIVOT ANGLE OF A HEADLAMP WHEN NEGOTIATING A BEND

(71) Applicant: Hella KGaA Hueck & Co., Lippstadt (DE)

(72) Inventors: Andreas Krauβ, Erwitte (DE); Boris Kubitza, Möhnesse-Körbecke (DE); Jürgen Schmidt, Paderborn (DE)

(73) Assignee: HELLA KGAA HUECK & CO., Lippstadt (DE)

(*) Notice: Subject to any disclaimer, the term of this patent is extended or adjusted under 35 U.S.C. 154(b) by 493 days.

(21) Appl. No.: 14/045,867

(22) Filed: Oct. 4, 2013

(65) Prior Publication Data
US 2014/0098551 A1   Apr. 10, 2014

(30) Foreign Application Priority Data
Oct. 4, 2012 (DE) .......... 10 2012 109 423

(51) Int. Cl.
*B60Q 1/08* (2006.01)
*F21S 8/10* (2006.01)
*B60Q 1/12* (2006.01)

(52) U.S. Cl.
CPC .......... *F21S 48/17* (2013.01); *B60Q 1/12* (2013.01); *B60Q 1/085* (2013.01); *B60Q 2300/32* (2013.01); *B60Q 2300/322* (2013.01)

(58) Field of Classification Search
CPC ....... B60Q 1/12; B60Q 1/085; B60Q 2300/32; B60Q 2300/322; F21S 48/17; F21S 48/171; F21S 48/1757; F21S 8/10; F21S 8/12
USPC .......................................................... 362/465
See application file for complete search history.

(56) References Cited

U.S. PATENT DOCUMENTS

2005/0052879 A1* 3/2005 Bahnmuller et al. ..... B60Q 1/12
                                                             362/465

FOREIGN PATENT DOCUMENTS

| DE | 10347552 A1 | 5/2005 | |
| DE | EP 2298603 A1 * | 3/2011 | ............... B60Q 1/12 |
| DE | 102009041698 A1 | 4/2011 | |
| DE | 102010019835 A1 | 11/2011 | |

* cited by examiner

Primary Examiner — Y M Lee
(74) Attorney, Agent, or Firm — Husch Blackwell LLP

(57) ABSTRACT

A method for setting a pivot angle of a headlamp with an asymmetrical low beam when a vehicle is negotiating a bend, wherein a course of a highway line is determined, a contact point is determined, wherein a tangent from the headlamp to the contact point makes contact with the highway line, and the headlamp is adjusted such that a projection of an intersection of a horizontal portion of a cut-off line of the headlamp and an ascending branch of the cut-off line of the headlamp in a plane in front of the vehicle and perpendicular to the longitudinal axis of the vehicle on the highway falls within a circle of predetermined radius around the contact point.

10 Claims, 3 Drawing Sheets

METHOD AND DEVICE FOR SETTING A PIVOT ANGLE OF A HEADLAMP WHEN NEGOTIATING A BEND

CROSS REFERENCE

This application claims priority to German Patent Application No. 10 2012 109423.3, filed Oct. 4, 2012.

TECHNICAL FIELD OF THE INVENTION

The invention relates to a method and device for setting a pivot angle of a headlamp with an asymmetrical low beam when a vehicle is negotiating a bend.

BACKGROUND OF THE INVENTION

Such a method and such an apparatus are known from patent application DE 10 2008 054 005 A1. FIG. 1 of that patent shows a plan view of a vehicle negotiating a bend. The vehicle has adaptive headlamps that are pivoted through a pivot angle with respect to the longitudinal axis of the vehicle. The procedure for adjusting the pivot angle and for determining the pivot angle at which the adaptive headlamps are pivoted is as follows: first, a so-called look-ahead distance is determined. In principle, the look-ahead distance can be arbitrarily established. The look-ahead distance on vehicles with headlamps installed at a height of 65 cm is usually 65 m. To obtain optimum illumination of the road when negotiating a bend or driving straight, the look-ahead distance is usefully set to the so-called reference beam range of the headlamps and the selected headlamp light distribution. The reference beam range results from statutory provisions under which the low beam must have a 1-% slope with respect to the longitudinal axis of the vehicle. The reference beam range for the low beam designates the location of the so-called knuckle.

The knuckle is the point that results from a projection of an intersection of a horizontal portion of a cut-off line of the headlamp and an ascending branch of the cut-off line of the headlamp in a plane on the road surface, wherein the plane in which the intersection lies is in front of the vehicle and perpendicular to the longitudinal axis of the vehicle. The plane can, for example, be a test surface for light from the headlamp, as used when setting headlamps (see "Motor Vehicle Lighting Technology and Screen Washing", ISBN: 3-7782-2039-X, p 35, FIGS. 15 and 16).

Once the look-ahead distance is determined, in the method disclosed in patent application DE 10 2008 054 005 A1, the point in the look-ahead distance from the vehicle is determined that lies on the centerline of the highway in the course of a highway that is to be traversed. Once this point is established, the direction of the point from the vehicle is determined. The angle between the calculated direction of the point on the centerline of the highway and the longitudinal axis of the vehicle is the desired pivot angle to which the headlamps are pivoted when negotiating a bend. After the headlamps have pivoted, the so-called knuckle lies in the middle of the highway.

According to the aforementioned method, when driving on the right, especially for left-hand turns, the headlamps swivel so extremely that the areas of the headlamps that are intended to illuminate only the right-hand side of the highway when driving in a straight line (and that are to the right of the so-called knuckle) also cast light on the left side of the highway. Thus there is a risk of oncoming traffic being dazzled. In right-hand bends, on the other hand, the knuckle of the cut-off line is partially pivoted over the right edge of the highway, resulting in a reduced illumination of the right-hand side of the highway.

SUMMARY OF THE INVENTION

The object of the present invention is to further develop a method and a device of the type mentioned above such that oncoming traffic is dazzled as little as possible and the driver's side of the highway is lit as well as possible.

The invention achieves this object in that
a profile of a highway line is determined,
a contact point is determined, wherein a tangent from the headlamp to the contact point makes contact with the highway line, and
the headlamp is set such that a projection of an intersection of a horizontal portion of a cut-off line of the headlamp and an ascending branch of the cut-off line of the headlamp in a plane in front of the vehicle and perpendicular to the longitudinal axis of the vehicle falls within a circle of predetermined radius about the contact point.

The determined highway line may for example be a centerline, the right edge of the highway, the left edge of the highway or any other highway line. A highway line can be, but need not be, a highway marking applied to the highway. Rather, a highway may be split into any number of highway lines. A highway line may be the predicted line based on the road layout and the position of the driver's vehicle. For example, the highway line may be the right or the left edge of the trajectory that the vehicle is expected to follow or that the vehicle will traverse as it moves forward.

The tangent from the headlamp to the contact point preferably coincides with a beam of light produced by the headlamp to the contact point.

The plane in front of the vehicle and perpendicular to the longitudinal axis of the vehicle, in which the intersection of the horizontal part of the cut-off line of the headlamp and the rising branch of the cut-off line of the headlamp is defined, can be a test surface, as already described in the introduction. In the context of the projection of this point, the point is often referred to as the knuckle, kink or inflection point.

The predetermined radius around the point of contact may be less than 1.5 m. Preferably it is less than 50 cm. It is desirable to match the projection of the intersection to the contact point.

In particular, a course of a highway for determining the highway line can be determined based on a digital road map, a navigation system and/or a camera system. It is also possible to determine a position of the vehicle. The determination of the vehicle position can also be used to determine the highway line. The determination of the position can be satellite-based, for example. The highway detection can be part of a lane-detection system, a lane tracking/lane assistant (lateral guidance, lane departure warning), a lane-keeping support system, a lane change assistant and/or a lane change support system.

According to the invention, it is possible to determine the highway line from the course of a highway and the position of the vehicle.

According to the invention, it is also possible to establish a look-ahead distance. The inventive method can be configured such that if a look-ahead distance is established, the adjustment of the headlamp in such a manner that the intersection falls within a circle of predetermined radius around the contact point only occurs if the contact point is not further away than the look-ahead distance.

Preferably, the inventive method is used for setting a pivot angle of at least one of at least two headlamps with an asymmetrical low beam. In this method, a first highway line and a first contact point are determined, wherein the first contact point is the point at which a first tangent line from a first headlamp to said first contact point touches the first highway line. It is then determined whether the first contact point is more distant from the vehicle than the look-ahead distance.

If the first contact point is not more distant from the vehicle than the look-ahead distance, the first headlamp can be set such that the projection of an intersection of a horizontal portion of a cut-off line of the first headlamp and an ascending branch of the cut-off line of the first headlamp in a plane in front of the vehicle and perpendicular to the longitudinal axis of the vehicle falls within a circle of predetermined radius about the contact point. The second of the at least two headlamps can also be adjusted in this way. However, it is also possible for the second headlamp to be adjusted according to other algorithms for setting bend lighting. For example, the setting can be performed using an algorithm for so-called dynamic bend lighting. It is also conceivable that the second headlamp does not pivot and remains adjusted to the setting for straight-line driving.

If the first contact point is more distant from the vehicle than the look-ahead distance, according to the invention a second highway line and a second contact point may be determined, wherein the second contact point is the point at which a second tangent from a second headlamp to the second contact point makes contact with the second highway line.

If the second contact point is not more distant from the vehicle than the look-ahead distance, the second headlamp can be set such that the projection of an intersection of a horizontal portion of a cut-off line of the second headlamp and an ascending branch of the cut-off line of the second headlamp in a plane in front of the vehicle and perpendicular to the longitudinal axis of the vehicle falls within a circle of predetermined radius about the second contact point. The first headlamp can also be adjusted in this way. However, it is also possible for the first headlamp to be adjusted according to other algorithms for setting bend lighting. For example, the setting can be performed using an algorithm for so-called dynamic bend lighting. Adjustment using an algorithm for dynamic bend lighting has the advantage that the influence of false or inaccurate prediction data from predictive bend lighting is prevented. It is also conceivable that the first headlamp does not pivot and remains adjusted to the setting for straight-line driving.

An inventive method can also be used with a device for adjusting a pivot angle of at least one headlamp having an asymmetric low beam while a vehicle that has an interface for connecting with a device for determining a course of a highway and a device for determining a position of the vehicle, The inventive device may comprise means for determining at least one highway line and one contact point, wherein a tangent from the headlamp to the contact point makes contact with the highway line. Furthermore, the device may have means for generating a control signal to adjust the headlamp such that a projection of an intersection of a horizontal portion of a cut-off line of the headlamp and an ascending branch of the cut-off line of the headlamp in a plane in front of the vehicle and perpendicular to the longitudinal axis of the vehicle falls within a circle of predetermined radius about the contact point.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

Figure 1:
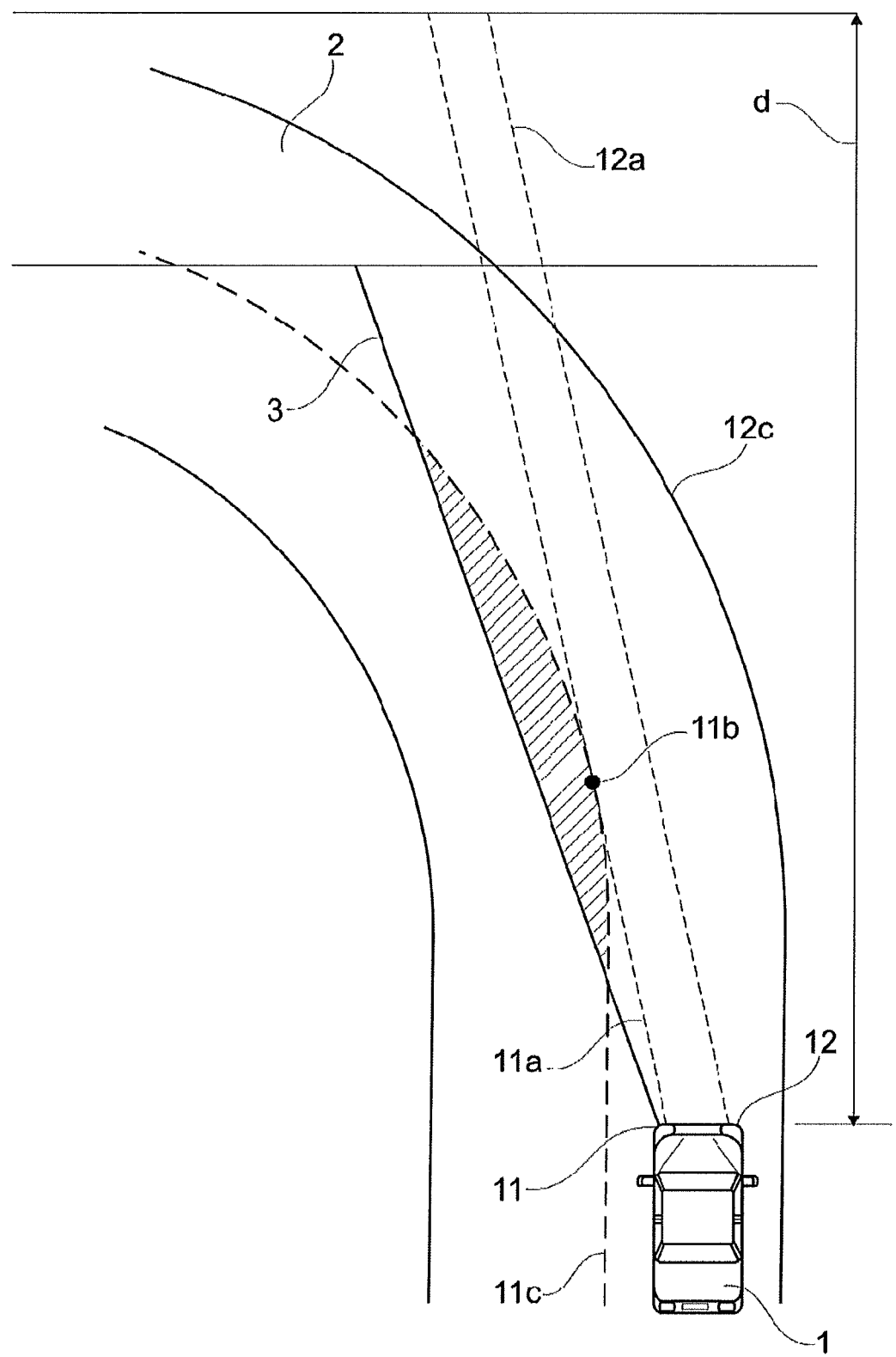
FIG. 1 A plan view of a vehicle just before entering bend to the left.
Figure 2:
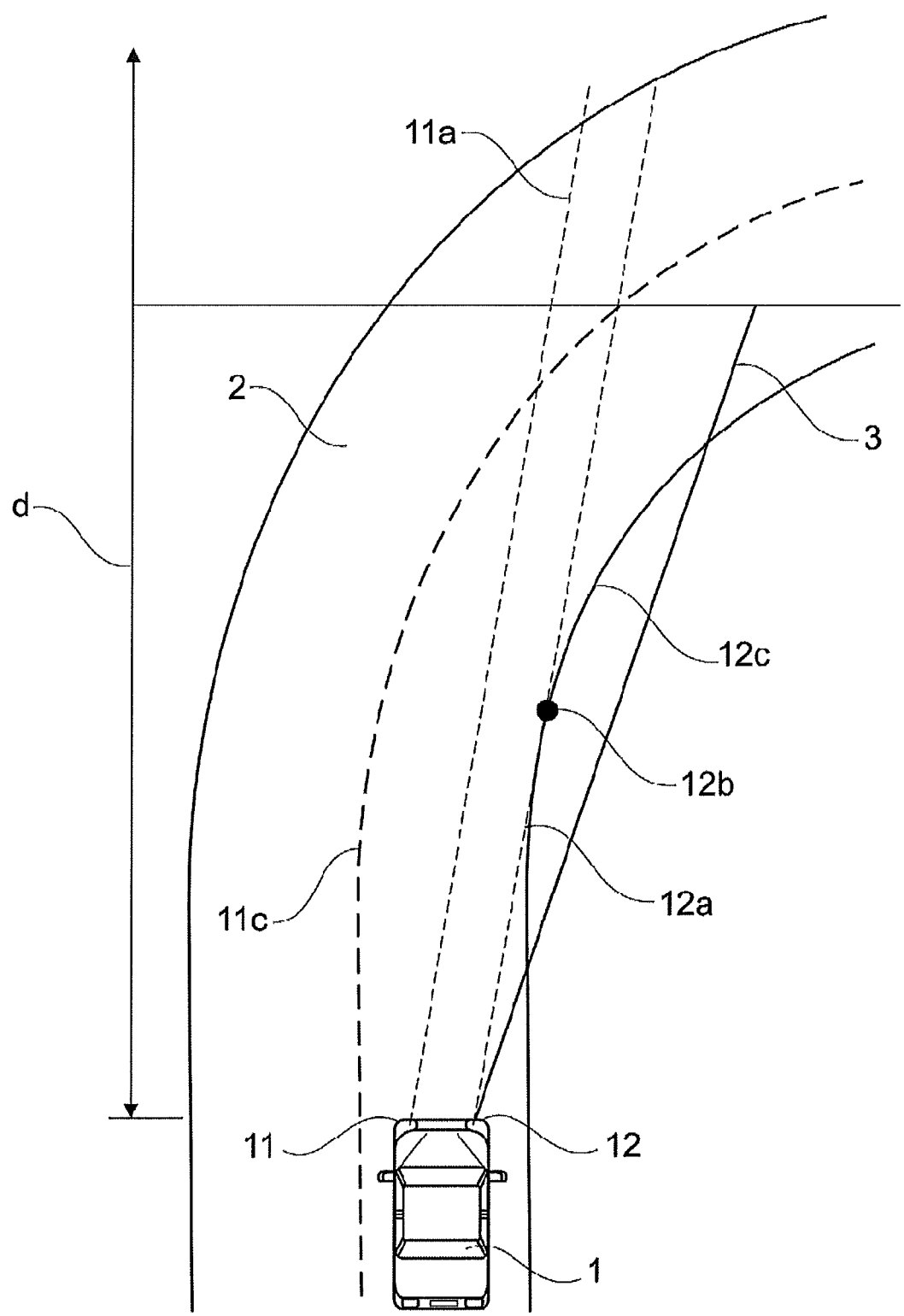
FIG. 2 A plan view of a vehicle just before entering bend to the right.

In FIGS. 1 and 2, reference number 1 designates the vehicle shortly before entering a left or right bend in a highway, 2. The vehicle, 1, has a left low-beam headlamp, 11, and a right low-beam headlamp, 12 The two headlamps are so-called adaptive headlamps, whereby the optical axis can be pivoted according to the course of a highway or a predicted trajectory of the vehicle, 1, such that the highway or stretch of highway to be traversed is illuminated.

Under the current ECE Regulation 48 it is permissible to pivot the dipped beam headlamps in the traffic situations depicted in FIGS. 1 and 2, to the lines indicated by reference number 3 in FIGS. 1 and 2. The angle between lines 3 and the longitudinal axis of the vehicle is the maximum permissible pivot angle, which is also set for adaptive headlamps on many vehicles in accordance with the prior art. However, setting the maximum permissible pivot angle has the consequence that when taking a left-hand bend—provided vehicles are driving on the right—light falls on an area of the oncoming lane is lit so that there is a possibility of oncoming vehicles being dazzled. On the other hand, when taking aright-hand bend—also provided vehicles are driving on the right—with the maximum permissible pivot setting, it may happen that the side of the highway on which the vehicle (1) is driving is not optimally illuminated, and instead a significant amount of light falls on the verges or the terrain to the right of the highway.

According to the inventive method, the maximum pivot angle is not set in the traffic situation shown in FIGS. 1 and 2.

Instead, in the situation as shown in FIG. 1, the left low-beam headlamp, 11, is pivoted such that the projection of the intersection of a horizontal portion of a cut-off line of the headlamp, 11, with an ascending branch of the cut-off line of the headlamp, 11, coincides with a first contact point, 11b, from a plane perpendicular to the vehicle longitudinal axis and coincident front of the vehicle to the road, 2. The first contact point, 11b, is the point obtained when a first tangent to the centerline of the road, 2, is drawn from the left low-beam headlamp, 11, which defines the left-hand boundary of predicted trajectory of the vehicle, 1. The centerline, 11c, constitutes a first highway line, as is also mentioned in the Claims. This then results in an optical axis, designated by reference number 11a, for the light emitted by the left low-beam headlamp, 11, which coincides with the first tangent. The same pivot angle is set for the right low-beam headlamp, 12.

In the traffic situation represented in FIG. 2, according to the inventive method, the right low-beam headlamp, 12, is adjusted so that the projection of the intersection of a horizontal portion of the cut-off line of the low-beam headlamp, 12, with an ascending branch of the cut-off line of the dip beam headlamp 12, from a plane perpendicular to the longitudinal axis of the vehicle and in front of the vehicle, 1, on the road coincides with a second contact point. The second contact point, 12b, is the point obtained when a second tangent to the second highway line 12c of the road, 2, is drawn from the right low-beam headlamp, 12, which defines the right-hand boundary of predicted trajectory of the vehicle, 1. The highway line constitutes a second highway line, 12c, as is also mentioned in the Claims. This then results in optical axis, designated by reference number 12a, for the light emitted by the right low-beam headlamp, 12, which coincides with the second tangent. The same pivot angle is set for the left low-beam headlamp, 11.

Figure 3:
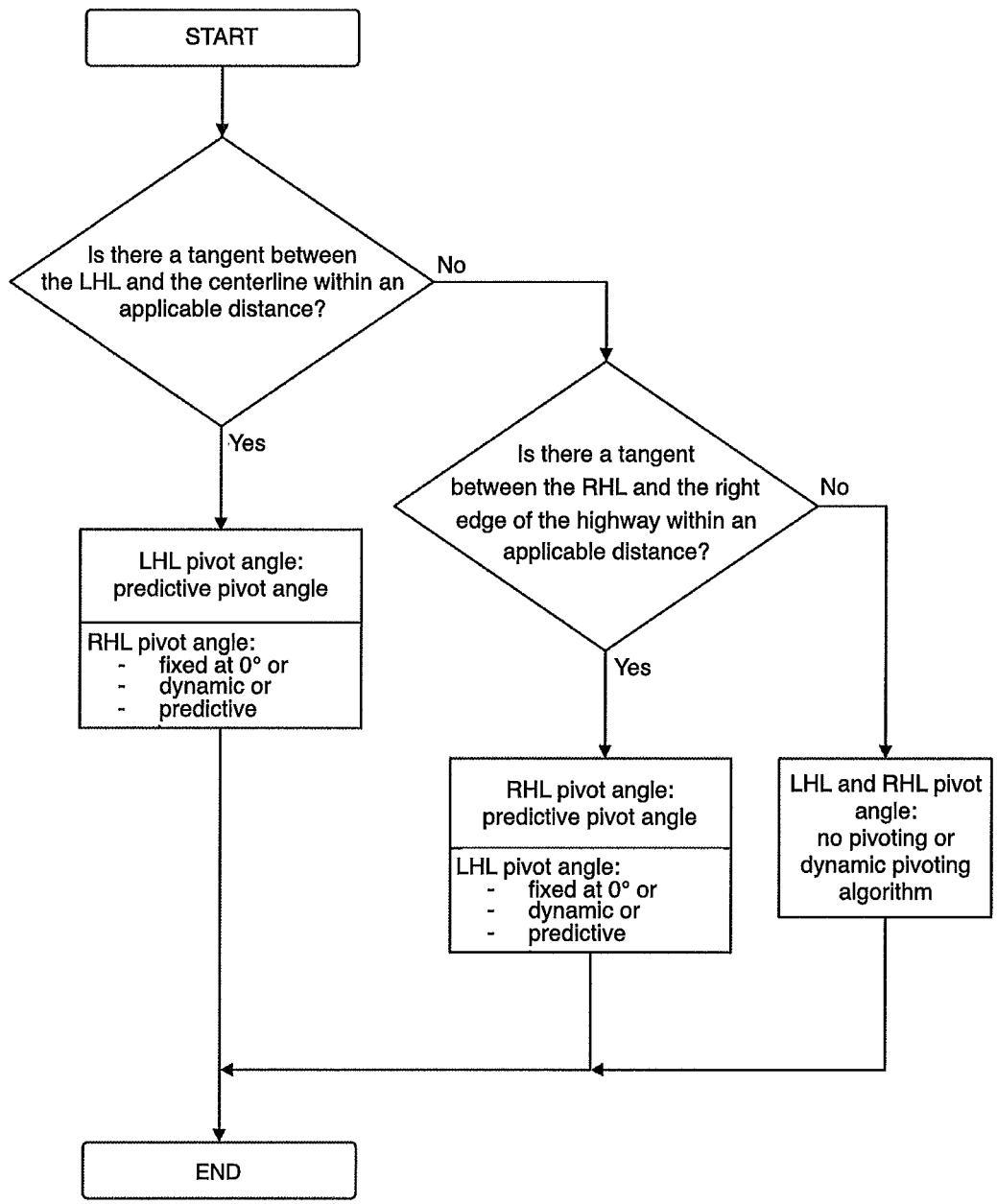
FIG. 3 A flow diagram for a method of the invention.

The method used for setting the low-beam headlamps, 11, 12, is shown in the flow chart in FIG. 3.

After starting the method, there is an initial check of whether a first tangent can be drawn from the left low-beam headlamp 11, referred to in the flow chart as "left headlamp, LHL", to the first highway line, 11c, i.e., the centerline, wherein the first contact point, 11b, is not more distant from the vehicle, 1, than a predetermined look-ahead distance, d (Condition 1). If that is the case, the pivot angle for the left low-beam headlamp, 11/LHL, is set such that the projection of the intersection of the horizontal portion and of the ascending branch of the cut-off line of the low-beam headlamp, 11/LHL, from a plane perpendicular to the longitudinal axis of the vehicle and in front of the vehicle, 1, on the road, 2, is coincident with the first contact point, 11b. This is the case if the first tangent from the low-beam headlamp, 11/LHL, to the first highway line coincides with the optical axis of the left low-beam headlamp, 11/LHL. The same pivot angle can be set for the right low-beam headlamp, 12, designated "RHL" in FIG. 3. However, it is also possible to not pivot the right low-beam headlamp, 12, or to dynamically or predictively pivot the same by some other method.

If Condition 1 is not met, a check is made of whether a second tangent can be drawn from the right low-beam headlamp, 12, to the second highway line, 12c, i.e., the right-hand highway marking, wherein the second contact point, 12b, is not more distant from the vehicle, 1, than a predetermined look-ahead distance, d (Condition 2). If that is the case, the pivot angle for the right low-beam headlamp, 12/RHL, is set such that the projection of the intersection of the horizontal portion and of the ascending branch of the cut-off line of the low-beam headlamp, 12/RHL, from a plane perpendicular to the longitudinal axis of the vehicle and in front of the vehicle, 1, on the road, 2, is coincident with the second contact point, 12b. This is the case if the second tangent from the low-beam headlamp, 12/RHL, to the second highway line coincides with the optical axis of the right low-beam headlamp, 12/RHL. The same pivot angle can be set for the left low-beam headlamp, 11. However, it is also possible to not pivot the left low-beam headlamp, 11, or to dynamically or predictively pivot the same by some other method. If the second condition is also not met, no pivot angle is set or another dynamic pivot angle is set.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

KEY TO FIGURES

1 Vehicle
11 Left low-beam headlamp
11a Optical axis of the left low-beam headlamp
11b Contact point of the first tangent/optical axis with the first highway line
11c First highway line
12 Right low-beam headlamp
12a Optical axis of the right low-beam headlamp
12b Contact point of the second tangent/optical axis with the second highway line
12c Second highway line
2 Highway
3 Line of the maximum pivot angle

The invention claimed is:

1. A method and device for setting a pivot angle of a headlamp with an asymmetrical low beam when a vehicle is negotiating a bend, comprising the steps of:
   determining a course of a highway line,
   determining a contact point, wherein a tangent from the headlamp to the contact point makes contact with the highway line, and
   determining a non-zero radius of a predetermined length about the contact point and setting the headlamp such that a projection of an intersection of a horizontal portion of a cut-off line of the headlamp and an ascending branch of the cut-off line of the headlamp in a plane in front of the vehicle and perpendicular to a longitudinal axis of the vehicle falls within a circle of the predetermined radius about the contact point.

2. The method according to claim 1, wherein step of determining said course of said highway line further comprises determining said course on one of a digital road map, a navigation system or a camera system.

3. The method according to claim 2, wherein the step of determining said course of said highway line further comprises using the position of the vehicle to determine said course.

4. The method according to claim 1, further comprising the step of determining a position of the vehicle.

5. The method according to one of claim 1, further comprising the step of establishing a look-ahead distance and wherein said step of setting said the headlamp comprising only setting the headlamps in such a manner that the intersection falls within a circle of predetermined radius around the contact point only if the contact point is not more distant than the look-ahead distance.

6. The method according to claim 1, wherein the vehicle has at least first and second headlamps with an asymmetrical low beam, wherein initially a first highway line and a first contact point are determined, wherein the first contact point is the point at which a first tangent line from a first headlamp to said first contact point touches the first highway line, it is then determined whether the first contact point is more distant from the vehicle than a look-ahead distance.

7. The method according to claim 6, wherein if the first contact point is not more distant from the vehicle than the look-ahead distance, the first headlamp is set such that the projection from an intersection of a horizontal part of a cut-off line of the first headlamp and an ascending branch of the cut-off line of the first headlamp falls in a plane in front of the vehicle and perpendicular to the longitudinal axis of the vehicle in the road in a circle with a predetermined radius around the first contact point.

8. The method according to claim 6, wherein if the first contact point is more distant from the vehicle than the look-ahead distance, a second highway line and a second contact point are determined, wherein the second contact point is the point at which a second tangent from a second headlamp to the second contact point makes contact with the second highway line.

9. The method according to claim 8, wherein if the second headlamp is set such that the projection from an intersection of a horizontal part of a cut-off line of the second headlamp and an ascending branch of the cut-off line of the second headlamp falls in a plane in front of the vehicle and perpendicular to the longitudinal axis of the vehicle in the road in a circle with a predetermined radius around the second contact point if the second contact point is not more distant from the vehicle than the look-ahead distance.

10. A device for adjusting a pivot angle of at least one headlamp having an asymmetric low beam while a vehicle is negotiating a bend according to the method of claim 1, comprising:

an interface for connecting with a device for at least one of determining a course of a highway or a device for determining a position of the vehicle, means for determining at least one highway line and one contact point, wherein a tangent from the headlamp to the contact point contacts the highway line, a circle of predetermined non-zero radius about the contact point;

means for generating a control signal to adjust the headlamp such that a projection of an intersection of a horizontal portion of a cut-off line of the headlamp and an ascending branch of the cut-off line of the headlamp in a plane in front of the vehicle and perpendicular to the longitudinal axis of the vehicle falls within the circle of predetermined radius about the contact point.

* * * * *